(12) United States Patent
Ogata et al.

(10) Patent No.: US 10,495,021 B2
(45) Date of Patent: Dec. 3, 2019

(54) ENGINE CONTROL DEVICE

(71) Applicant: HITACHI AUTOMOTIVE SYSTEMS, LTD., Hitachinaka-shi, Ibaraki (JP)

(72) Inventors: Kenichiroh Ogata, Hitachinaka (JP); Yoshinobu Arihara, Hitachinaka (JP); Hisahiro Ooba, Hitachinaka (JP); Takaki Itaya, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/071,944

(22) PCT Filed: Jan. 10, 2017

(86) PCT No.: PCT/JP2017/000366
§ 371 (c)(1),
(2) Date: Jul. 23, 2018

(87) PCT Pub. No.: WO2017/138279
PCT Pub. Date: Aug. 17, 2017

(65) Prior Publication Data
US 2019/0063363 A1   Feb. 28, 2019

(30) Foreign Application Priority Data
Feb. 9, 2016   (JP) .................. 2016-022701

(51) Int. Cl.
*F02D 41/40* (2006.01)
*F02D 41/02* (2006.01)
(Continued)

(52) U.S. Cl.
CPC ........... *F02D 41/402* (2013.01); *F02D 41/02* (2013.01); *F02D 41/04* (2013.01); *F02D 41/34* (2013.01);
(Continued)

(58) Field of Classification Search
CPC ........ F02D 41/40; F02D 41/402; F02D 41/02; F02D 41/04; F02D 41/34; F02D 43/00;
(Continued)

(56) References Cited

U.S. PATENT DOCUMENTS

| 4,915,086 A | 4/1990 | Ciliberto et al. |
| 6,354,269 B1 * | 3/2002 | Saito ..................... F01N 3/0842 |
| | | 123/436 |

(Continued)

FOREIGN PATENT DOCUMENTS

| DE | 10139058 A1 | 4/2002 |
| DE | 102008001606 A1 | 11/2009 |

(Continued)

OTHER PUBLICATIONS

International Search Report, PCT/JP2017/000366, dated Apr. 25, 2017, 1 pg.

(Continued)

*Primary Examiner* — Hieu T Vo
(74) *Attorney, Agent, or Firm* — Volpe and Koenig, P.C.

(57) ABSTRACT

Provided is an engine control device capable of suppressing deterioration of combustion stability due to a change in engine temperature in an engine which performs lean combustion or EGR combustion. When lean combustion in which an air-fuel mixture leaner than a stoichiometric air-fuel ratio is burned or exhaust gas recirculation combustion in which a diluted air-fuel mixture is burned by re-suctioning exhaust gas discharged from the combustion chamber into the combustion chamber is performed, a ratio of a fuel injection amount during a compression stroke to a total fuel injection amount during one combustion cycle is increased as a temperature of an engine decreases.

10 Claims, 10 Drawing Sheets

(51) Int. Cl.
*F02D 41/04* (2006.01)
*F02D 41/34* (2006.01)
*F02D 43/00* (2006.01)
*F02D 45/00* (2006.01)
*F02P 3/045* (2006.01)
*F02P 9/00* (2006.01)

(52) U.S. Cl.
CPC .............. *F02D 43/00* (2013.01); *F02D 45/00* (2013.01); *F02P 3/045* (2013.01); *F02P 9/002* (2013.01); *F02D 2200/021* (2013.01); *Y02T 10/47* (2013.01)

(58) Field of Classification Search
CPC .... F02D 45/00; F02D 2200/021; F02P 3/045; F02P 9/002; Y02T 10/47
See application file for complete search history.

(56) References Cited

U.S. PATENT DOCUMENTS

| | | |
|---|---|---|
| 2002/0020386 A1 | 2/2002 | Ogawa et al. |
| 2002/0134081 A1 | 9/2002 | Shiraishi et al. |
| 2007/0068485 A1 | 3/2007 | Hilditch |
| 2009/0281709 A1 | 11/2009 | Mallebrein et al. |
| 2014/0000558 A1 | 1/2014 | Katou |

FOREIGN PATENT DOCUMENTS

| | | |
|---|---|---|
| JP | 2002-276418 A | 9/2002 |
| JP | 2006-169994 A | 6/2009 |
| JP | 5423924 B2 | 2/2014 |

OTHER PUBLICATIONS

Extended European Search Report dated Aug. 28, 2019 for the European Patent Application No. 17750004.8.

* cited by examiner

FIG. 4

| START INSTRUCTION SIGNAL KS | 0 | 1 | 1 | 1 | 1 | 1 |
|---|---|---|---|---|---|---|
| G SENSOR SIGNAL GS | | GS < GL | GS > GL | | | |
| COOLING WATER TEMPERATURE TW | | TW < TLF | TW < TLF | TW ≥ TLF | TW ≥ TLE | TW ≥ TLL |
| OPERATION MODE MD | 0 (BEFORE ENGINE START) | 1 (CATALYST WARM-UP MODE AFTER START) | 2 (CATALYST WARM-UP PROHIBITION MODE AFTER START) | 3 (HOMOGENEOUS OPERATION MODE AFTER START) | 4 (EGR OPERATION MODE AFTER START) | 5 (LEAN OPERATION MODE AFTER START) |

FIG. 5

| OPERATION MODE MD | 0 | 1 | 2 | 3 | 4 | 5 |
|---|---|---|---|---|---|---|
| TARGET AIR-FUEL RATIO TRGAF | | Stra. Map | Homo. Map | | Homo. Map | Lean Map |
| TARGET EGR RATE TRGEGR | | Stop Map | Stop Map | | EGR Map | Lean Map |
| TARGET INJECTION RATIO TRGINJSP | | Stra. Map | Homo. Map | | EGR Map | Lean Map |
| TARGET INJECTION TIMING TRGINJTn | | Stra. Map | Homo. Map | | EGR Map | Lean Map |
| TARGET IGNITION ENERGY TRGIGNE | | Inc. Map | Nor. Map | | EGR Map | Lean Map |
| TARGET IGNITION TIMING TRGIGNT | | Stra. Map | Homo. Map | | EGR Map | Lean Map |

FIG. 7
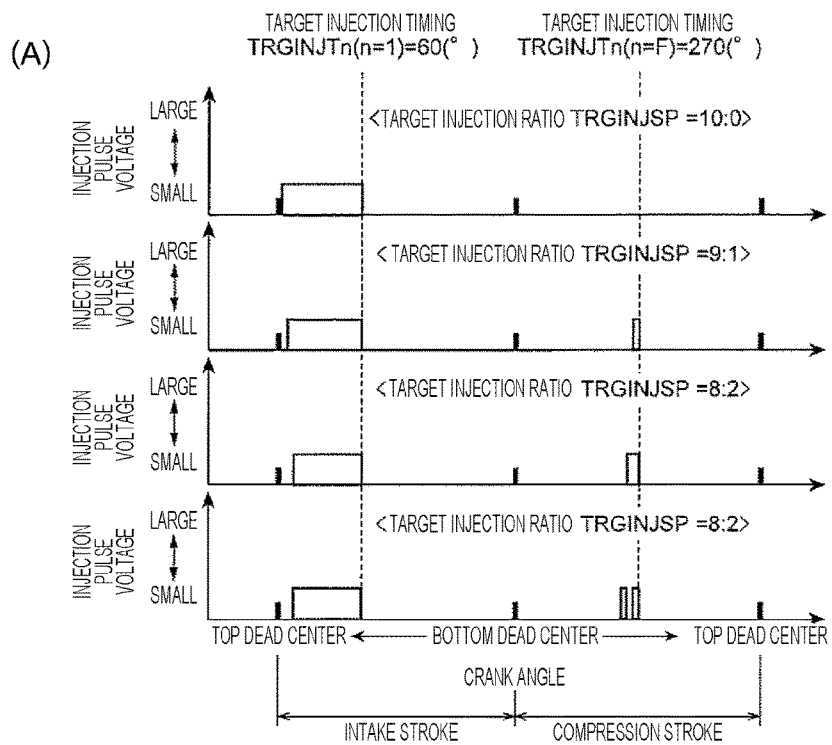
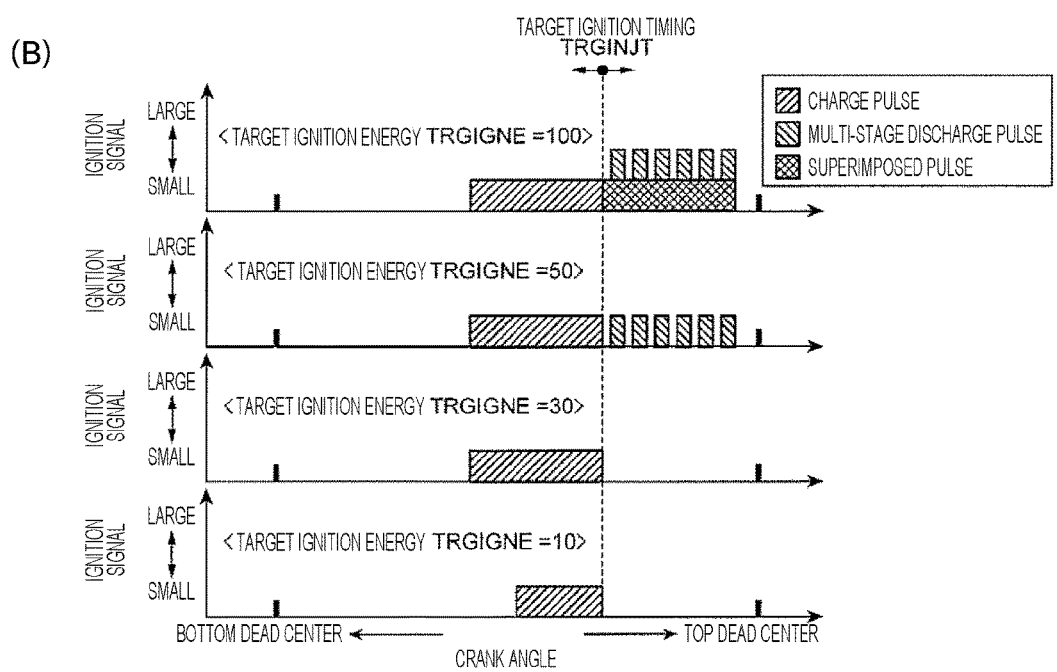

ENGINE CONTROL DEVICE

TECHNICAL FIELD

The present invention relates to an engine control device mounted on a vehicle or the like.

BACKGROUND ART

From viewpoints of environmental preservation and energy conservation, an engine that is a power source mounted on a vehicle such as an automobile is required to have high efficiency and exhaust gas purification. For the high efficiency, it is effective to improve combustion performed in a combustion chamber inside the engine. As that means, there is lean combustion that burns air-fuel mixture leaner than a stoichiometric air-fuel ratio of fuel and air, exhaust gas recirculation (EGR) combustion (hereinafter referred to as EGR combustion) that re-suctions (also referred to as refluxes) exhaust gas discharged from a combustion chamber into the combustion chamber by burning air-fuel mixture in the combustion chamber and burns the air-fuel mixture diluted by the exhaust gas, or the like.

However, in the combustion that aims to achieve such high efficiency, the combustion stability is deteriorated according to an operating state or an environmental condition. Therefore, a situation that cannot obtain high efficiency and low exhaust performance, at which the combustion can occur, may occur according to a condition.

To address such a problem, for example, PTL 1 discloses a fuel injection control device for an internal combustion engine having an in-cylinder fuel injection device, the fuel injection control device including: a jetting division ratio setting means for setting a jetting division ratio of an amount of fuel injected during an intake stroke to an amount of fuel injected during a compression stroke according to an operating state or an environmental condition of the internal combustion engine; and an operating means for injecting part or all of the required fuel during the intake stroke according to a set jetting division ratio and operating an in-cylinder fuel injection device so as to inject the remaining fuel during the compression stroke, in which, in a case where it is determined that the temperature of the air suctioned into the cylinder is higher than the temperature of the fuel injected from the in-cylinder fuel injection device, the jetting division ratio setting means sets the jetting division ratio so as to increase the ratio of the amount of the fuel injected during the intake stroke, as compared with a case where it is determined to be lower.

According to the prior art disclosed in PTL 1, in a case where the temperature of the air suctioned into the cylinder is higher than the temperature of the fuel injected from the in-cylinder fuel injection device, the fuel tends to be atomized by contact with high temperature air, and in such a situation, the amount of fuel attached to a wall surface of the cylinder decreases and the attached fuel also easily evaporates. Conversely, in a case where the temperature of the air suctioned into the cylinder is lower, the jetting division ratio is set so as to increase the ratio of the amount of the fuel injected during the compression stroke, as compared with the case where the temperature of the air suctioned into the cylinder is higher. Thus, it is possible to reduce the amount of the fuel attached to the wall of the cylinder without being vaporized.

CITATION LIST

Patent Literature

PTL 1: JP 5423924 B2

SUMMARY OF INVENTION

Technical Problem

However, as in the prior art disclosed in PTL 1, since a temperature condition inside the combustion chamber is not considered simply by monitoring the temperature of the air suctioned into the cylinder and the temperature of the fuel injected from the in-cylinder fuel injection device, it is difficult to cope with the change in the temperature of the air-fuel mixture in the combustion chamber when the temperature of the engine changes and it is impossible to solve the deterioration of the combustion speed of the air-fuel mixture in the combustion chamber.

More specifically, when the temperature of the engine decreases, the temperature of the air-fuel mixture in the combustion chamber decreases accordingly, the combustion speed of the air-fuel mixture decreases, and the combustion reaction upon ignition or flame propagation becomes unstable, leading to the deterioration of the combustion stability. In the prior art disclosed in PTL 1, such deterioration of the combustion stability of the lean combustion or the EGR combustion due to the decrease in the engine temperature cannot be suppressed.

The present invention has been made in view of the above problems, and an object of the present invention is to provide an engine control device capable of suppressing deterioration of combustion stability accompanied by a change in engine temperature in an engine which performs lean combustion or EGR combustion.

Solution to Problem

To achieve the above object, an engine control device according to the present invention includes: a fuel injection device which performs fuel injection a plurality of times during one combustion cycle with respect to a combustion chamber of an engine; an ignition device which ignites fuel supplied from the fuel injection device to the combustion chamber; and a temperature detection unit which detects a temperature of the engine, a fuel injection amount injected from the fuel injection device being controlled based on the temperature of the engine detected by the temperature detection unit, wherein when lean combustion in which an air-fuel mixture leaner than a stoichiometric air-fuel ratio is burned or an exhaust gas recirculation combustion in which a diluted air-fuel mixture is burned by re-suctioning exhaust gas discharged from the combustion chamber into the combustion chamber is performed, a ratio of a fuel injection amount during a compression stroke to a total fuel injection amount during one combustion cycle is increased as the temperature of the engine decreases.

Advantageous Effects of Invention

According to the present invention, as an engine temperature decreases, a ratio of a fuel injection amount during a compression stroke to a total fuel injection amount during one combustion cycle is increased. Thus, during lean combustion or EGR combustion, a decrease in a combustion speed due to a decrease in an engine temperature, that is, a decrease in a temperature of an air-fuel mixture in a combustion chamber can be suppressed by a high combustion speed of a rich-side air-fuel mixture accompanied by an increase in a ratio of a fuel injection amount during a compression stroke. Therefore, the deterioration of combustion stability of lean combustion or EGR combustion can be suppressed, and eventually a high efficiency performance and a low exhaust performance of the lean combustion or the EGR combustion can be maximized.

The problems, configurations, and effects other than those described above will become apparent from the description of the following embodiments.

BRIEF DESCRIPTION OF DRAWINGS

FIG. 4 is an operation mode determination table used in an operation mode calculation unit illustrated in FIG. 3.

FIG. 5 is a diagram illustrating a relationship between an operation mode and a control map used in a control value calculation unit illustrated in FIG. 3.

FIG. 7 is a change characteristic diagram of a control signal due to change in each target value, in which (A) is a change characteristic diagram of an injection pulse voltage due to a change in a target injection ratio, and (B) is a change characteristic diagram of an ignition signal due to a change in target ignition energy.

DESCRIPTION OF EMBODIMENTS

Hereinafter, embodiments of the present invention will be described with reference to the drawings.

Figure 1:
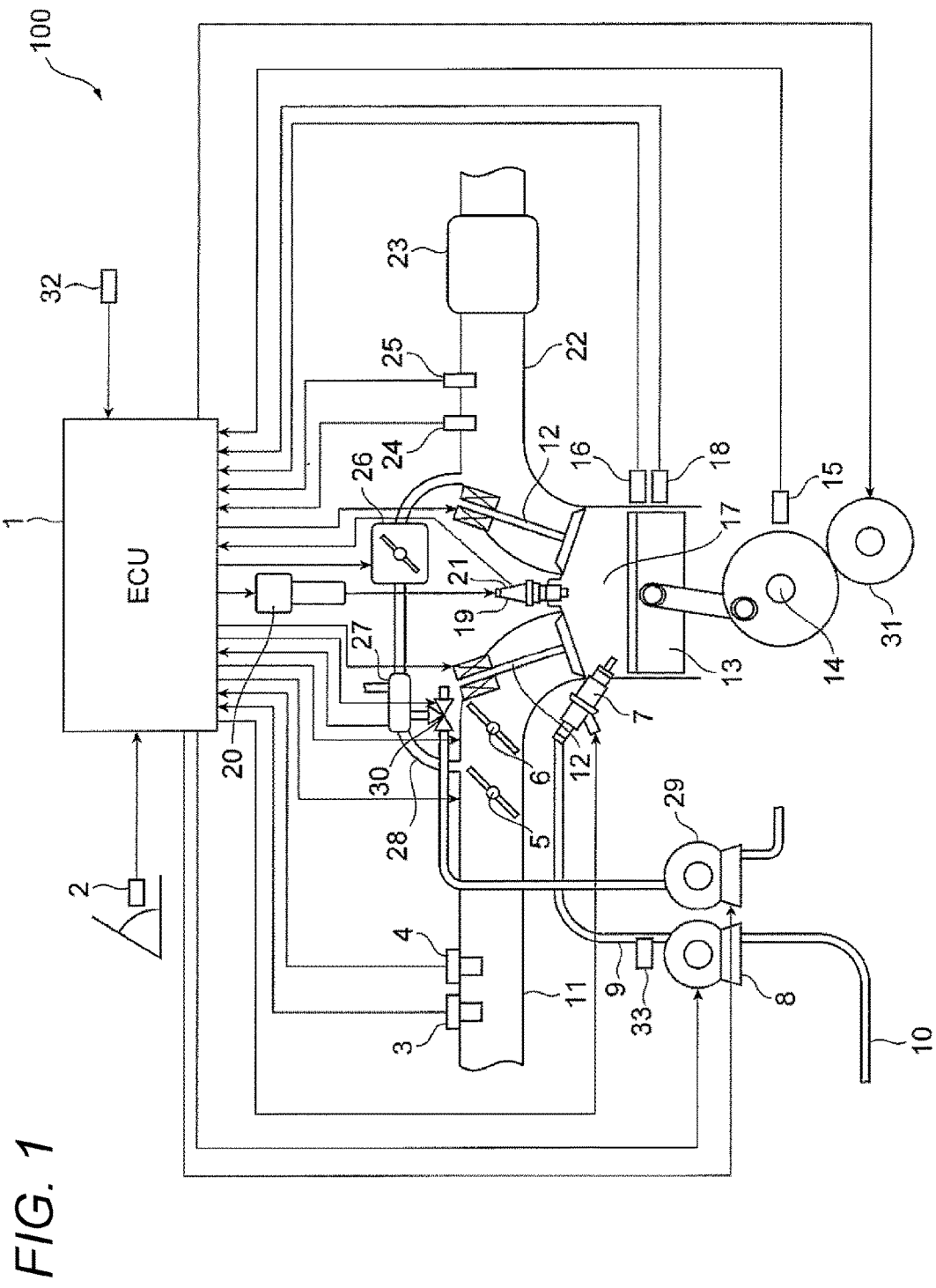
FIG. 1 is a system configuration diagram illustrating a schematic configuration of an automobile engine to which an engine control device (ECU) according to the present invention is applied.

FIG. 1 is a system configuration diagram illustrating a schematic configuration of an automobile engine to which an engine control device (ECU) according to the present invention is applied.

An engine 100 according to an illustrated embodiment is an automobile engine which performs spark ignition stoichiometric air-fuel ratio combustion, spark ignition EGR combustion, and spark ignition lean combustion.

In the engine 100, an airflow sensor 3 which measures an amount of intake air to an intake pipe 11, a throttle 5 which adjusts a pressure in the intake pipe 11, an intake air temperature and humidity sensor 4 which is one embodiment of an intake air temperature and humidity detector and measures a temperature and a humidity of intake air, and a tumble valve 6 which makes the area of the intake pipe 11 variable are provided at each appropriate position of the intake pipe 11. The airflow sensor 3 may be an intake air pressure sensor which measures the pressure of the intake air. In addition, the engine 100 is provided with a fuel injection device (hereinafter, referred to as an injector) 7 which injects (direct-injects in the illustrated example) fuel in a combustion chamber 17 (in the cylinder) and a spark plug 19 which is a part of an ignition device which supplies ignition energy for igniting the fuel supplied to the combustion chamber 17, and a variable valve 12 which adjusts intake air flowing into the combustion chamber 17 and exhaust gas discharged from the combustion chamber 17 is provided at an appropriate position of the engine 100. The variable valve 12 varies a period during which an intake valve and an exhaust valve are opened or an opening and closing timing, and the variable valve may be provided only in the intake valve. In addition, by changing the closing timing of the intake valve, the actual compression ratio can be changed and the pressure and the temperature in the combustion chamber 17 can be varied. In addition, a common rail 9 which is connected to the injector 7 and supplies the fuel to the injector 7, a fuel pump 8 for pumping the fuel to the common rail 9, and a fuel pipe 10 which supplies the fuel to the fuel pump 8 are provided at each appropriate position of the engine 100. In addition, a fuel pressure sensor 33 which is one aspect of a fuel pressure detector and measures the pressure of the fuel is provided at an appropriate position of the common rail 9. Here, the fuel pressure sensor 33 may be a fuel temperature sensor. In addition, the spark plug (part of the ignition device) 19 is connected to an ignition coil (part of the ignition device) 20, and the ignition energy is controlled by the ignition coil 20. It should be noted that the ignition coil 20 may be controlled by a separate control device.

Further, a three-way catalyst 23 which purifies the exhaust gas discharged from the combustion chamber 17 to the exhaust pipe 22 after burning the air-fuel mixture in the combustion chamber 17, an exhaust gas temperature sensor 24 which is one aspect of an exhaust gas temperature detector and measures the temperature of the exhaust gas on the upstream side of the three-way catalyst 23, and an air-fuel ratio sensor 25 which is one aspect of an air-fuel ratio detector and detects the air-fuel ratio of the exhaust gas at the upstream side of the three-way catalyst 23 are provided at each appropriate position of the exhaust pipe 22. The air-fuel ratio sensor 25 may be an oxygen concentration sensor. In addition, an exhaust gas reflux pipe 28 which returns (refluxes) part of the exhaust gas (also referred to as refluxed gas or recirculated gas), which is discharged to the exhaust pipe 22, to the intake pipe 11 may be provided between the exhaust pipe 22 (the upstream side of the three-way catalyst 23 in the illustrated example) and the intake pipe 11 (between the throttle 5 and the tumble valve 6 in the illustrated example), and an EGR valve 26 which adjusts an exhaust gas reflux rate and an EGR cooler 27 which is one aspect of a refluxed gas temperature detector which detects the refluxed gas temperature and adjusts the refluxed gas temperature are provided at appropriate positions of the exhaust gas reflux pipe 28. In addition, the EGR cooler 27 has a cooling water entrance for performing temperature adjustment of the refluxed gas temperature, and a cooling water pump 29 for controlling a flow rate of the cooling water and a cooling water flow path switching valve 30 are provided at each appropriate position of the engine 100.

In addition, a crankshaft 14 for moving a piston 13 provided in the cylinder is constituted by a main shaft and a sub shaft, and the sub shaft is connected to the piston 13 through a connecting rod. Here, the engine 100 is provided with a control shaft 31 in which a distance between the main shaft and the sub shaft or a length of the connecting rod can be varied. By providing this mechanism, the stroke amount of the piston 13 can be varied and the pressure and the temperature in the combustion chamber 17 can be varied. It should be noted that the mechanism for making the stroke amount of the piston 13 variable is not limited to the above. The crankshaft 14 is provided with a crank angle sensor 15 for detecting an angle and a rotational speed of the crankshaft 14 and a moving speed of the piston 13. In addition, the engine 100 is provided with a knock sensor 16 for detecting vibration of the engine 100 as acceleration. In addition, a pressure sensor 21 which detects the pressure inside the combustion chamber 17 is provided at an appropriate position of the engine 100. The pressure sensor 21 may be an ion current sensor which detects the amount of ions inside the engine 100. In addition, in order to detect the temperature of the engine 100, a cooling water temperature sensor 18 which detects a cooling water temperature inside the engine 100 is provided at an appropriate position of the engine 100.

Signals obtained from the airflow sensor 3, the intake air temperature and humidity sensor 4, the crank angle sensor 15, the knock sensor 16, the cooling water temperature sensor 18, the pressure sensor 21, the exhaust gas temperature sensor 24, the air-fuel ratio sensor 25, and the EGR cooler 27 are sent to the ECU 1 as the control device. A signal obtained from an accelerator pedal opening degree sensor 2 which detects a stepping amount of an accelerator pedal, that is, an opening degree of the accelerator pedal, is also sent to the ECU 1. In addition, the engine 100 is mounted on an automobile, and information about a traveling state of the automobile is also sent to the ECU 1. For example, a signal obtained from a vehicle speed sensor attached to a wheel or a vehicle body on which the engine 100 is mounted or a sensor (hereinafter, collectively referred to as a G sensor 32) which measures an acceleration or angle, and a signal obtained from a shift lever position sensor (not illustrated) which detects a position of a shift lever for controlling a transmission attached to the vehicle body on which the engine 100 is mounted are also input to the ECU 1 directly or through another control device.

The ECU 1 calculates a required torque based on the output signal of the accelerator pedal opening degree sensor 2, or the like. That is, the accelerator pedal opening degree sensor 2 is used as a required torque detection sensor which detects a required torque to the engine 100. Based on the output signal of the crank angle sensor 15, the ECU 1 calculates the angle and rotational speed of the crankshaft 14 and the moving speed of the piston 13. The ECU 1 calculates the operating state of the engine 100 from the output signals of the above-described various sensors and, based on the operating state of the engine 100, appropriately calculates the main operation amount of the engine 100, such as a driving signal (opening degree or the like) of the throttle 5, a driving signal (opening degree or the like) of the tumble valve 6, an injection signal of the injector 7, a driving signal of the fuel pump 8, a driving signal (valve opening and closing timing or the like) of the variable valve 12, an ignition control signal of the ignition coil 20, a driving signal (opening degree or the like) of the EGR valve 26, a driving signals of the cooling water pump 29 and the cooling water flow path switching valve 30 as cooling water control, a driving signal of the control shaft 31 which controls the stroke amount of the piston 13, and the like. The throttle opening degree calculated by the ECU 1 is sent to the throttle 5 as a throttle driving signal. The tumble valve opening degree calculated by the ECU 1 is sent to the tumble valve 6 as a tumble valve driving signal. The injection signal calculated by the ECU 1 is converted into an injector valve opening pulse signal (also referred to as an injection pulse signal) and sent to the injector 7. The fuel pump driving signal calculated by the ECU 1 is sent to the fuel pump 8. The valve opening and closing timing calculated by the ECU 1 is sent to the variable valve 12 as a variable valve driving signal. The ignition control signal calculated by the ECU 1 is sent to the ignition coil 20 as an ignition control signal instructing ignition once or a plurality of times so as to be ignited at the ignition timing calculated by the ECU 1. The EGR valve opening degree calculated by the ECU 1 is sent to the EGR valve 26 as an EGR valve driving signal. The cooling water control signal calculated by the ECU 1 is sent to the cooling water pump 29 and the cooling water flow path switching valve 30 as cooling water control driving signals. The target piston stroke signal calculated by the ECU 1 is sent to the control shaft 31 as a control shaft driving signal.

In the engine 100 having the above-described configuration, the fuel is injected from the injector 7 to forma combustible air-fuel mixture with respect to an air-fuel mixture of the air flowing into the combustion chamber 17 from the intake pipe 11 through the intake valve and the refluxed gas refluxed from the exhaust pipe 22 to the intake pipe 11 through the EGR valve 26 and the EGR cooler 27 and flowing into the combustion chamber 17. The combustible air-fuel mixture in the combustion chamber 17 is burned at a predetermined ignition timing by spark generated from the spark plug 19 supplied with ignition energy by the ignition coil 20, and the piston 13 is pushed down by the combustion pressure to become the driving force of the engine 100. The exhaust gas after the combustion is sent to the three-way catalyst 23 through the exhaust valve and the exhaust pipe 22, and the exhaust gas component is purified in the three-way catalyst 23 and then discharged.

Figure 2:
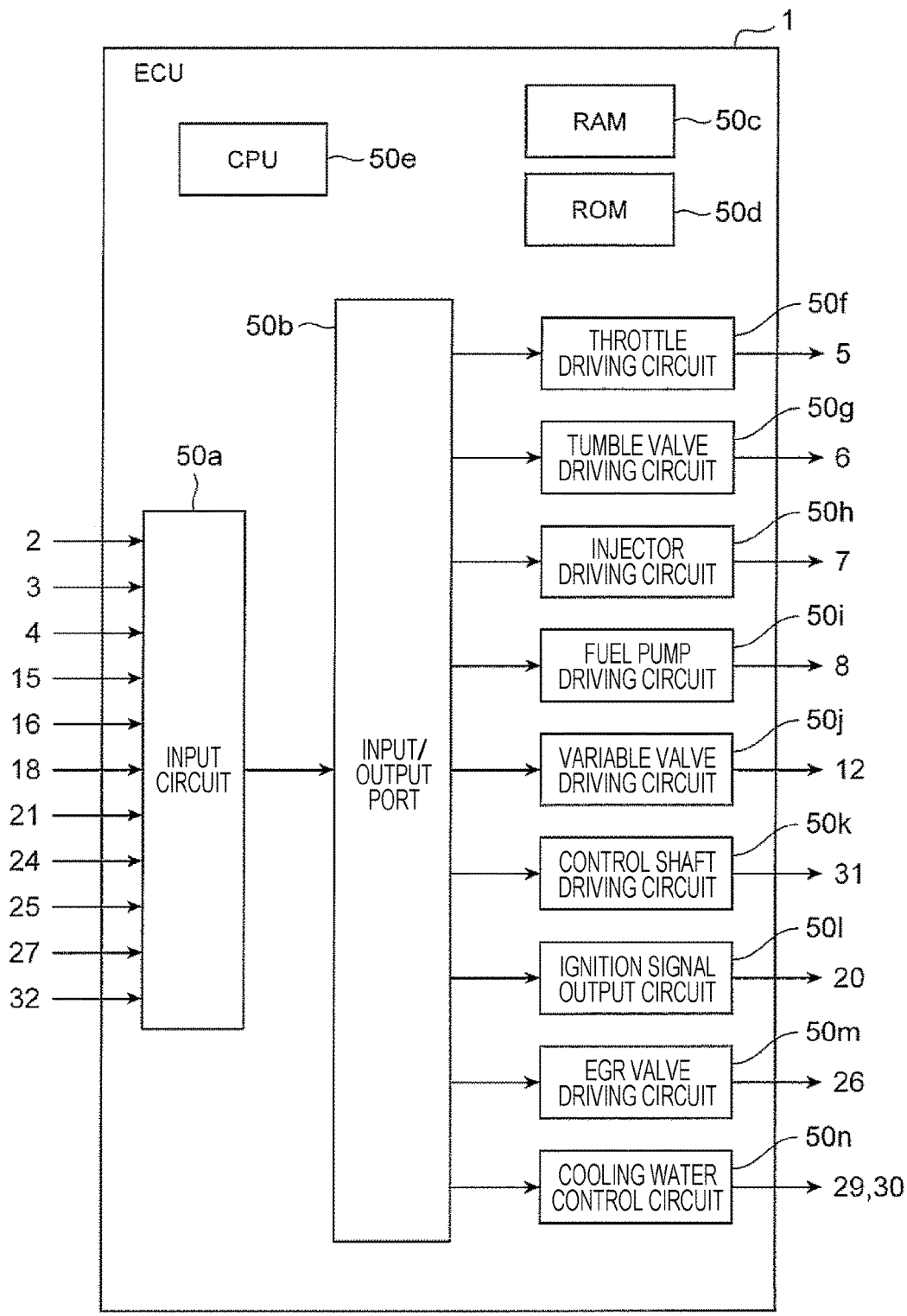
FIG. 2 is a system block diagram illustrating an internal configuration of the ECU illustrated in FIG. 1.

FIG. 2 is a system block diagram illustrating the internal configuration of the ECU 1 illustrated in FIG. 1.

The output signals of the accelerator pedal opening degree sensor 2, the airflow sensor 3, the intake air temperature and humidity sensor 4, the crank angle sensor 15, the knock sensor 16, the cooling water temperature sensor 18, the pressure sensor 21, the exhaust gas temperature sensor 24, the air-fuel ratio sensor 25, the EGR cooler 27 (the refluxed gas temperature detector provided therein), the G sensor 32, and the like are input to an input circuit 50a of the ECU 1. However, the input signals to the input circuit 50a are not limited thereto. The input signal of each sensor, which is input to the input circuit 50a, is sent to an input port of an input/output port 50b. A value sent to the input/output port 50b is stored in a RAM 50c and arithmetically processed by a CPU 50e. A control program describing the contents of the arithmetic processing is written in a ROM 50d in advance. After a value indicating an operation amount of each actuator calculated according to the control program is stored in the RAM 50c, the value is sent to an output port of the input/output port 50b and sent to each actuator through each of driving circuits 50f to 50n. In the case of the present embodiment, the driving circuits include a throttle driving circuit 50f, a tumble valve driving circuit 50g, an injector driving circuit 50h, a fuel pump driving circuit 50i, a variable valve driving circuit 50j, a control shaft driving circuit 50k, an ignition signal output circuit 50l, an EGR valve driving circuit 50m, a cooling water control circuit 50n, and the like. Each of the driving circuits 50f to 50n controls the throttle 5, the tumble valve 6, the injector 7, the fuel pump 8, the variable valve 12, the control shaft 31, the ignition coil 20, the EGR valve 26, the cooling water pump 29, or the cooling water flow path switching valve 30 based on the value indicating the operation amount of each actuator sent from the input/output port 50b. In the present embodiment, although the driving circuits 50f to 50n are provided in the ECU 1, the present invention is not limited thereto, and any of the driving circuits 50f to 50n may be provided in the ECU 1.

Figure 3:
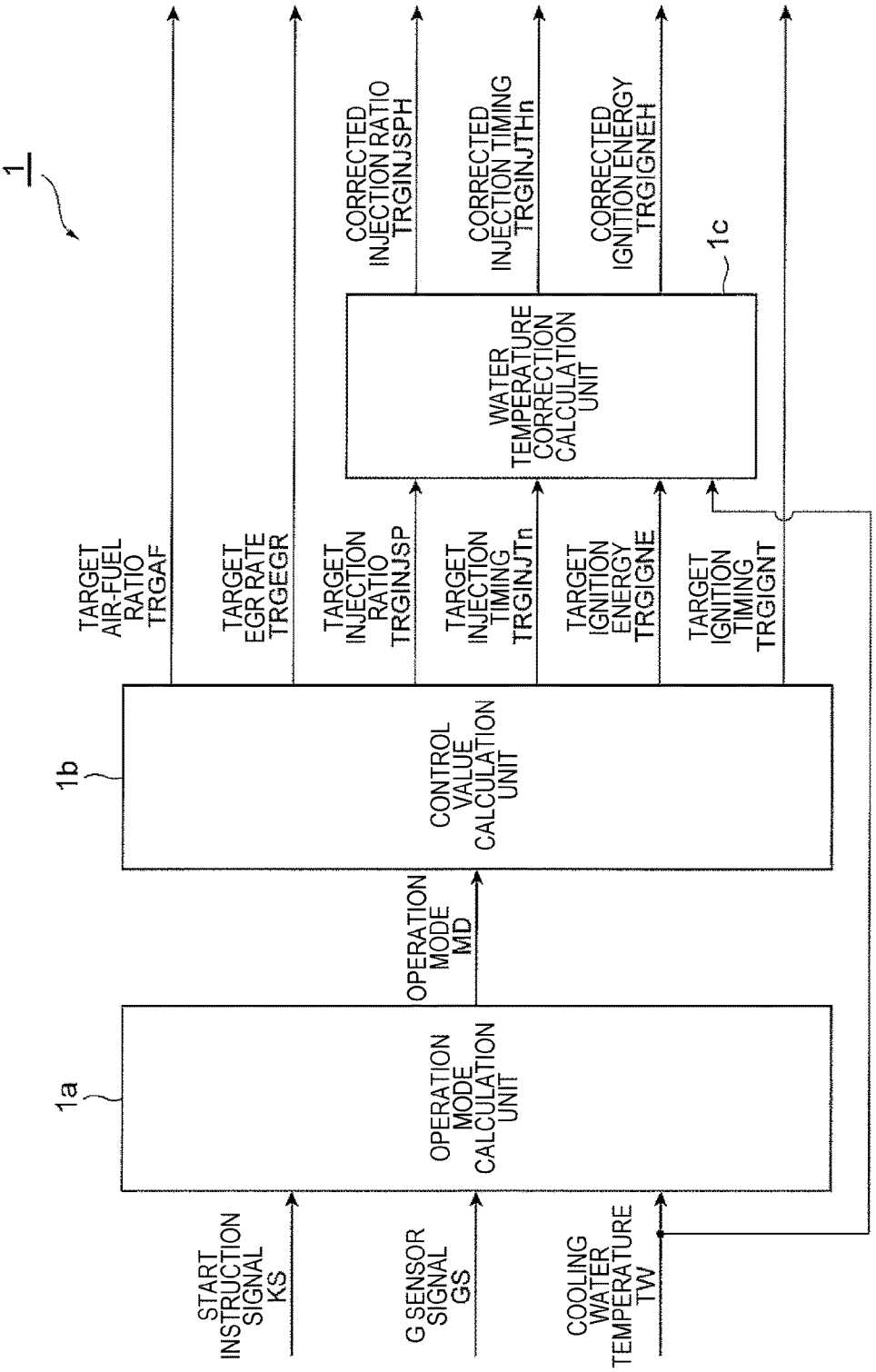
FIG. 3 is an arithmetic logic diagram illustrating a main configuration of a calculation logic of the ECU illustrated in FIG. 1.

FIG. 3 is an arithmetic logic diagram illustrating a main part of a calculation logic of the ECU 1 illustrated in FIG. 1.

As illustrated, the ECU 1 includes an operation mode calculation unit 1a, a control value calculation unit 1b, and a water temperature correction calculation unit 1c as the main configuration for realizing the present invention. Hereinafter, the configuration and operation of each calculation unit of the ECU 1 will be sequentially described.

<Operation Mode Calculation Unit>

As illustrated in FIG. 3, a start instruction signal (a signal instructing the start or stop of the engine 100) KS, a G sensor signal (a signal obtained from the G sensor 32) GS, and a cooling water temperature (a signal obtained from the cooling water temperature sensor 18) TW, and the like are input to the operation mode calculation unit 1a, and an operation mode MD is output as a calculation result. Here, the input signals to the operation mode calculation unit 1a are not limited thereto. The operation mode calculation unit 1a calculates the operation mode MD of the engine 100 with a value from 0 to 5 according to the start instruction signal KS, the G sensor signal GS, and the cooling water temperature TW.

FIG. 4 is an operation mode determination table used in the operation mode calculation unit 1a illustrated in FIG. 3. When the start instruction signal KS is 0, the G sensor signal GS and the cooling water temperature TW are not referred to and the operation mode MD is 0. The operation mode MD is 1 when the start instruction signal KS is 1, the G sensor signal GS is less than a G sensor signal limit GL, and the cooling water temperature TW is less than a cooling water temperature limit TLF. In addition, the operation mode MD is 2 when the start instruction signal KS is 1, the G sensor signal GS is greater than the G sensor signal limit GL, and the cooling water temperature TW is less than the cooling water temperature limit TLF. In addition, the operation mode MD is 3 when the start instruction signal KS is 1 and the cooling water temperature TW is equal to or greater than the cooling water temperature limit TLF. Furthermore, the operation mode MD is 4 when the start instruction signal KS is 1 and the cooling water temperature TW is greater than a cooling water temperature limit TLE which is greater than the cooling water temperature limit TLF. Furthermore, the operation mode MD is 5 when the start instruction signal KS is 1 and the cooling water temperature TW is equal to or greater than a cooling water temperature limit TLL which is greater than the cooling water temperature limit TLE. Here, the operation mode MD=0 represents before engine start, the operation mode MD=1 represents a catalyst warm-up mode after start, the operation mode MD=2 represents a catalyst warm-up prohibition mode after start, the operation mode MD=3 represents a homogeneous operation mode after start, the operation mode MD=4 represents an EGR operation mode after start, and the operation mode MD=5 represents a lean operation mode after start.

<Control Value Calculation Unit>

As illustrated in FIG. 3, the operation mode MD calculated by the operation mode calculation unit 1a is input to the control value calculation unit 1b, and a target air-fuel ratio TRGAF, a target EGR rate TRGEGR, a target injection ratio TRGINJSP, a target injection timing TRGINJTn, a target ignition energy TRGIGNE, and a target ignition timing TRGIGNT are output as the calculation result (control values). Here, when calculating each control value, the control value calculation unit 1b selects a control map having different control values according to the value of the operation mode MD as illustrated in FIG. 5. Here, the calculation of the control value is not based on the control map, but may be based on different control models or physical formulae.

Figure 6:
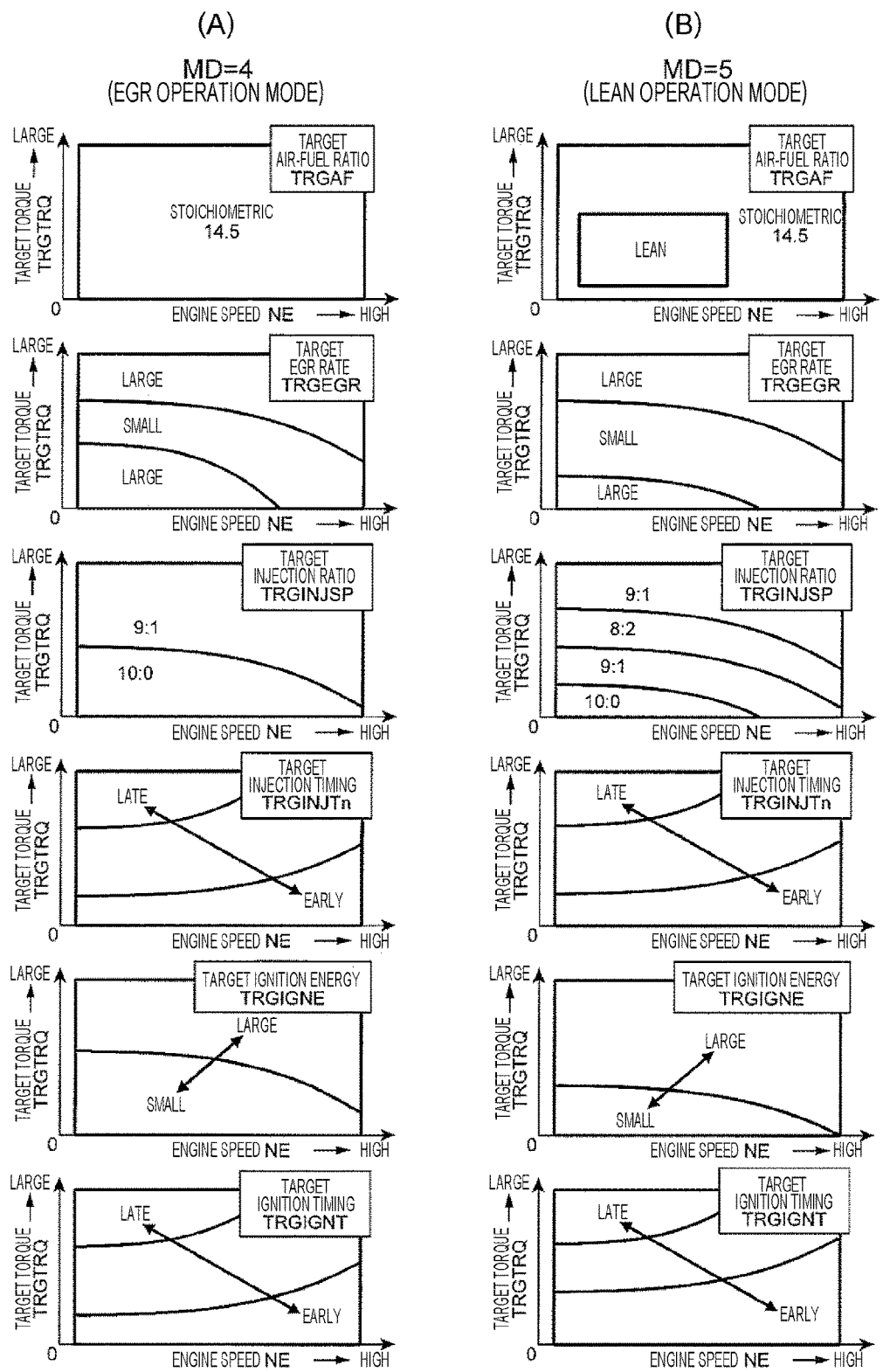
FIG. 6 is a characteristic diagram of the control map selected based on the operation mode in the control value calculation unit illustrated in FIG. 3, in which (A) a characteristic diagram of a control map of an EGR operation mode and (B) is a characteristic diagram of a control map of a lean operation mode.

FIG. 5 is a diagram illustrating a relationship between an operation mode and a control map used in the control value calculation unit 1b illustrated in FIG. 3. When the operation mode MD is 0, no map is referred to for the calculation of the target air-fuel ratio TRGAF, the target EGR rate TRGEGR, the target injection ratio TRGINJSP, the target injection timing TRGINJTn, the target ignition energy TRGIGNE, and the target ignition timing TRGIGNT. When the operation mode MD is 1, a control map for catalyst warm-up is referred to for the calculation of the target air-fuel ratio TRGAF, the target EGR rate TRGEGR, the target injection ratio TRGINJSP, the target injection timing TRGINJTn, the target ignition energy TRGIGNE, and the target ignition timing TRGIGNT. When the operation mode MD is 2 or 3, a control map for a homogeneous operation is referred to for the calculation of the target air-fuel ratio TRGAF, the target EGR rate TRGEGR, the target injection ratio TRGINJSP, the target injection timing TRGINJTn, the target ignition energy TRGIGNE, and the target ignition timing TRGIGNT. When the operation mode MD is 4, a control map for an EGR operation is referred to for the calculation of the target air-fuel ratio TRGAF, the target EGR rate TRGEGR, the target injection ratio TRGINJSP, the target injection timing TRGINJTn, the target ignition energy TRGIGNE, and the target ignition timing TRGIGNT. When the operation mode MD is 5, a control map for a lean operation is referred to for the calculation of the target air-fuel ratio TRGAF, the target EGR rate TRGEGR, the target injection ratio TRGINJSP, the target injection timing TRGINJTn, the target ignition energy TRGIGNE, and the target ignition timing TRGIGNT. In the control value calculation unit 1b, a suitable control value corresponding to each operation mode MD can be given by using the map reference (or model reference) as described above, FIG. 6 is a characteristic diagram of the control map selected based on the operation mode in the control value calculation unit 1b illustrated in FIG. 3, in which FIG. 6(A) is a characteristic diagram of the control map of the EGR operation mode and FIG. 6(B) is a characteristic diagram of the control map of the lean operation mode. In each of FIGS. 6(A) and 6(B), a vertical axis represents a target torque TRGTRQ, and a horizontal axis represents an engine speed NE. The target torque TRGTRQ is set according to the required torque obtained based on the output signal of the accelerator pedal opening degree sensor 2.

First, the control map for the EGR operation in FIG. 6(A) will be described. In the control map for the EGR operation, the target air-fuel ratio TRGAF is set as the stoichiometric air-fuel ratio according to the increase in the target torque TRGTRQ and the reduction in the rotation of the engine speed NE. The target EGR rate TRGEGR is increased on the decrease side and the increase side of the target torque TRGTRQ and is increased according to the high rotation of the engine speed NE. The target injection ratio TRGINJSP is set to 10:0 for completing the fuel injection from the injector 7 in the intake stroke, 90% in the intake stroke, and 9:1 for injecting 10% of the fuel in the compression stroke. Here, the total fuel injection amount during one combustion cycle of the fuel injected from the injector 7 is determined in advance based on the operating state of the engine 100 (the target torque TRGTRQ, the engine speed NE, or the like). The target injection ratio TRGINJSP may be set to ratios other than this ratio. In this case, the target injection timing TRGINJTn indicates the injection completion timing of each division injection which performs fuel injection a plurality of times during one combustion cycle with respect to the combustion chamber 17 (during at least the intake stroke and the compression stroke), and indicates n=F (n is the number of division injections, and F is the last stage of division injection). That is, here, the target injection timing TRGINJTn indicates the injection completion timing of the last stage of the division injection. The target injection timing TRGINJTn is set to be advanced as the engine speed NE increases and the target torque TRGTRQ decreases. The target ignition energy TRGIGNE is a characteristic that increases as the engine speed NE increases and the target torque TRGTRQ increases, and the target ignition timing TRGIGNT is set to be advanced as the engine speed NE increases and the target torque TRGTRQ decreases. It should be noted that the target ignition energy TRGIGNE and the target ignition timing TRGIGNT may perform setting other than this setting.

Next, the control map for the lean operation in FIG. 6(B) will be described. In the control map for the lean operation, the target air-fuel ratio TRGAF is set to be leaner (than the stoichiometric air-fuel ratio) in a lean region determined according to the increase in the target torque TRGTRQ and the reduction in the rotation of the engine speed NE. The target EGR rate TRGEGR has a characteristic that is increased on the decrease side and the increase side of the target torque TRGTRQ and is increased according to the high rotation of the engine speed NE, but has a characteristic different from the control map for the EGR operation. The target injection ratio TRGINJSP is set to 10:0 for completing the fuel injection from the injector 7 in the intake stroke, 90% in the intake stroke, 9:1 for injecting 10% of the fuel in the compression stroke, 80% in the intake stroke, and 8:2 for injecting 20% of the fuel in the compression stroke. The target injection ratio TRGINJSP may be set to ratios other than this ratio. In this case, the target injection timing TRGINJTn indicates the injection completion timing of each division injection which performs fuel injection a plurality of times during one combustion cycle with respect to the combustion chamber 17, and indicates n=F (n is the number of division injections, and F is the last stage of division injection). The target injection timing TRGINJTn is set to be advanced as the engine speed NE increases and the target torque TRGTRQ decreases. The target ignition energy TRGIGNE is a characteristic that increases as the engine speed NE increases and the target torque TRGTRQ increases, and the target ignition timing TRGIGNT is set to be advanced as the engine speed NE increases and the target torque TRGTRQ decreases. It should be noted that the target ignition energy TRGIGNE and the target ignition timing TRGIGNT may perform setting other than this setting.

Since the control map for the catalyst warm-up or the control map for the homogeneous operation among the control maps selected by the control value calculation unit 1b is the same as that conventionally known, a detailed description thereof will be omitted.

FIG. 7 is a change characteristic diagram of a control signal due to change in each target value, in which FIG. 7(A) is a change characteristic diagram of an injection pulse voltage due to a change in a target injection ratio, and FIG. 7(B) is a change characteristic diagram of an ignition signal due to a change in target ignition energy.

FIG. 7(A) illustrates a change in an injection pulse voltage (corresponding to an injection pulse width) for driving the injector 7 when the target injection ratio TRGINJSP is changed according to a change in the operating state or the like of the engine 100. For example, when the target injection timing TRGINJTn (n=1) (the first injection completion timing) is 60)(° and the target injection timing TRGINJTn (n=F) (the injection completion timing of the last stage) is 270)(°, in a case where the target injection ratio TRGINJSP is 10:0, one injection pulse voltage is applied during the intake stroke, as illustrated in the uppermost part, and in a case where the target injection ratio TRGINJSP is 9:1, one injection pulse voltage is applied during the intake stroke and one injection pulse voltage is applied during the compression stroke, as illustrated in the second drawing from the top. Here, in a case where the target injection ratio TRGINJSP further changes from 9:1 to 8:2 (see, for example, the target injection ratio TRGINJSP in FIG. 6(B)), the duration (injection pulse width) of the injection pulse voltage signal of the last stage during the compression stroke is extended, as illustrated in the second drawing from the bottom, and the injection pulse voltage signal during the compression stroke is added to the bottom dead center side from the injection pulse voltage signal of the last stage, as illustrated in the lowermost drawing. The upper limit value of the number of division injections that can be performed during the compression stroke is determined in advance by, for example, the characteristics of the injector 7 or the like.

Therefore, when the target injection ratio TRGINJSP changes according to the operating state or the like of the engine 100, the control value calculation unit 1b can appropriately control the injector 7 (injection pulse width thereof) according to the target injection ratio TRGINJSP and can appropriately supply fuel to the combustion chamber 17.

FIG. 7(B) illustrates a change in the ignition signal for controlling the ignition coil 20 when the target ignition energy TRGIGNE is changed according to a change in the operating state of the engine 100 or the like. For example, when the target ignition timing TRGIGNT is given and the target ignition energy TRGIGNE is 100, as illustrated in the uppermost drawing, a charge pulse that serves to charge the ignition coil 20 on the bottom dead center side from the target ignition timing TRGIGNT is given, and a multi-stage discharge pulse that increases the number of discharges on the top dead center side from the target ignition timing TRGIGNT and a superimposed pulse that serves to overlap the ignition coil 20 on the top dead center side from the target ignition timing TRGIGNT are entered. In a case where the target ignition energy TRGIGNE is 50, as illustrated in the second drawing from the top, a charge pulse that serves to charge the ignition coil 20 to the bottom dead center side from the target ignition timing TRGIGNT is given, and a multi-stage discharge pulse that increases the number of discharges on the top dead center side from the target ignition timing TRGIGNT is entered. In a case where the target ignition energy TRGIGNE is 30, as illustrated in the second drawing from the bottom, a charge pulse that serves to charge the ignition coil 20 on the bottom dead center side from the target ignition timing TRGIGNT is entered. In a case where the target ignition energy TRGIGNE is 10, as illustrated in the lowermost drawing, a charge pulse that serves to charge the ignition coil 20 on the bottom dead center side from the target ignition timing TRGIGNT is input in a shorter period than a case where the target ignition energy TRGIGNE is 30. Since the configuration for generating the charge pulse, the multi-stage discharge pulse, and the superimposed pulse is conventionally known, a detailed description thereof will be omitted. In addition, the duration (charge time) of the charge pulse, the number of multi-stage discharge pulses (number of discharges), and the upper limit value of the duration (superimposed time) of the superimposed pulse are determined in advance by, for example, the characteristics of the ignition coil 20. By using these in appropriate combination, the target ignition energy TRGIGNE set according to the operating state of the engine 100 or the like is realized.

Therefore, when the target ignition energy TRGIGNE changes according to the operating state of the engine 100 or the like, the control value calculation unit 1*b* can appropriately control the ignition coil 20 (the target ignition energy thereof) by changing the charge time, the number of discharges, and the superimposing time stepwise according to the target ignition energy TRGIGNE, and can appropriately ignite and burn the fuel supplied from the injector 7 into the combustion chamber 17.

<Water Temperature Correction Calculation Unit>

Returning to FIG. 3, among the control values calculated by the control value calculation unit 1*b*, the target injection ratio TRGINJSP, the target injection timing TRGINJTn (in particular, the target injection timing TRGINJTn (n=F) representing the injection completion timing of the last stage among them), and the target ignition energy TRGIGNE are input to the water temperature correction calculation unit 1*c*, and the cooling water temperature TW related to the engine temperature is input to the water temperature correction calculation unit 1*c*. The water temperature correction calculation unit 1*c* corrects the target injection ratio TRGINJSP, the target injection timing TRGINJTn, and the target ignition energy TRGIGNE according to the cooling water temperature TW, and outputs a corrected injection ratio TRGINJSPH, a corrected injection timing TRGINJTHn, and a corrected ignition energy TRGIGNEH as the calculation result.

Here, as an index related to the engine temperature, the cooling water temperature (the temperature of the cooling water for cooling the engine body) TW obtained from the cooling water temperature sensor 18 is employed, but the present invention is not limited thereto. For example, a temperature of a lubricating oil of the engine 100, a temperature of the surface of the engine 100, or the like may be used.

Figure 8:
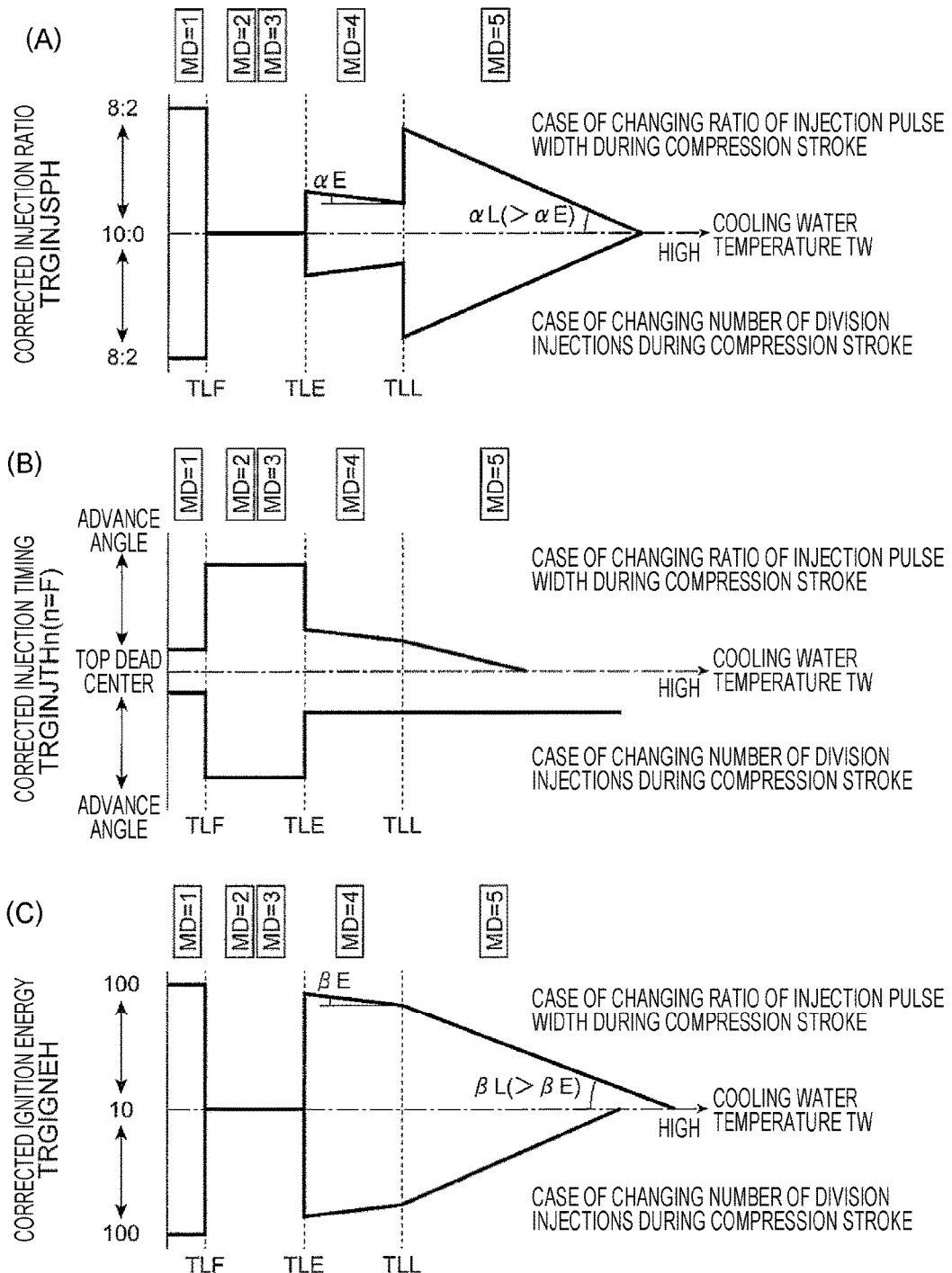
FIG. 8 is a characteristic diagram used in a water temperature correction calculation unit illustrated in FIG. 3, in which (A) is a characteristic diagram used in a calculation of a corrected injection ratio based on an engine temperature, (B) is a characteristic diagram used in a calculation of a corrected injection timing based on an engine temperature, and (C) is a characteristic diagram used in a characteristic diagram used in a calculation of corrected ignition energy based on an engine temperature.

FIG. 8 is a characteristic diagram used in the water temperature correction calculation unit 1*c* illustrated in FIG. 3, in which FIG. 8(A) is a characteristic diagram used in the calculation of the corrected injection ratio TRGINJSPH based on the engine temperature, FIG. 8(B) is a characteristic diagram used in the calculation of the corrected injection timing TRGINJTHn based on the engine temperature, and FIG. 8(C) is a characteristic diagram used in the calculation of the corrected ignition energy TRGIGNEH based on the engine temperature.

<<Calculation of Corrected Injection Ratio>>

FIG. 8(A) illustrates the characteristic of the corrected injection ratio TRGINJSPH with respect to the cooling water temperature TW, illustrates a case where the upper side from the cooling water temperature TW of the horizontal axis changes the ratio of the injection pulse width during the compression stroke (the ratio of the injection pulse width during the compression stroke to the total injection pulse width during the intake stroke and the compression stroke), and illustrates a case where the lower side changes the number of division injections during the compression stroke (the number of division injections during the compression stroke while maintaining the total fuel injection amount during one combustion cycle).

In calculating the corrected injection ratio TRGINJSPH, no correction is performed on the target injection ratio TRGINJSP in any of the operation modes MD=1, 2, 3. In the operation mode MD==4 (EGR operation mode after start), as the cooling water temperature TW decreases, the correction is performed to increase the ratio of the injection pulse width during the compression stroke (or increase the number of division injections during the compression stroke) with respect to the target injection ratio TRGINJSP, such that the injection pulse width during the compression stroke (that is, the ratio of the fuel injection amount during the compression stroke to the total fuel injection amount during one combustion cycle) is increased. Furthermore, in the operation mode MD=5 (lean operation mode after start), as the cooling water temperature TW decreases, the correction is performed to increase the ratio of the injection pulse width during the compression stroke (or increase the number of division injections during the compression stroke) with respect to the target injection ratio TRGINJSP, such that the increase tendency (specifically, the increase tendency of the ratio of the fuel injection amount during the compression stroke to the decrease in the cooling water temperature TW) becomes larger than that in the operation mode MD=4.

Here, although the corrected injection ratio TRGINJSPH is discontinuously set in the operation mode MD=4 and the operation mode MD=5, the corrected injection ratio TRGINJSPH may be discontinuously set according to the characteristics of the engine 100 or the like.

By performing such correction, the temperature of the engine 100 decreases when the lean combustion or the EGR combustion is performed, and the ratio of the fuel injection amount during the compression stroke to the total fuel injection amount during one combustion cycle increases. The decrease in the combustion speed due to the decrease in the engine temperature, that is, the decrease in the temperature of the air-fuel mixture in the combustion chamber 17, can be suppressed by the high combustion speed of the rich-side air-fuel mixture accompanied by the increase in the ratio of the fuel injection amount during the compression stroke. In addition, it is possible to accurately control the generation of the air-fuel mixture having the high combustion speed by driving the injector 7. More specifically, at the ignition timing by the spark plug 19, the air-fuel mixture in the combustion chamber 17 (in the cylinder of the engine 100) approaches the stoichiometric air-fuel ratio from the lean air-fuel ratio as it approaches the spark plug 19. In other words, at the ignition timing by the spark plug 19, the air-fuel mixture around the spark plug 19 in the combustion chamber 17 approaches the stoichiometric air-fuel ratio from the lean air-fuel ratio. Therefore, the stoichiometric air-fuel ratio around the spark plug 19 and the lean air-fuel mixture leaning away from the spark plug 19 can be arranged in the combustion chamber 17. Even when the temperature of the engine 100 is lowered during the lean combustion or the EGR combustion, the combustion reaction spreading from the spark plug 19 into the combustion chamber 17 can be smoothly propagated, and the combustion speed of the air-fuel mixture in the combustion chamber 17 can be increased.

<<Calculation of Corrected Injection Timing>>

FIG. 8(B) illustrates the characteristic of the corrected injection timing TRGINJTHn (in particular, the corrected injection timing TRGINJTHn (n=F) representing the injection completion timing of the last stage) with respect to the cooling water temperature TW, illustrates a case where the upper side from the cooling water temperature TW of the horizontal axis changes the ratio of the injection pulse width during the compression stroke, and illustrates a case where the lower side changes the number of division injections during the compression stroke.

In calculating the corrected injection timing TRGINJTHn, the target injection timing TRGINJTn is not corrected in any of the operation modes MD=1, 2, 3. In the operation mode MD=4 (EGR operation mode after start), as the cooling water temperature TW decreases with respect to the target injection timing TRGINJTn, the correction is performed to be advanced (that is, the injection completion timing (the falling timing of the injection pulse) is advanced) (an example illustrating a case of changing the ratio of the injection pulse width during the compression stroke on the upper side from the horizontal axis in FIG. 8(B)) or to be constant (an example illustrating a case of changing the number of division injections during the compression stroke on the lower side from the horizontal axis in FIG. 8(B)). Even in the operation mode MD=5 (lean operation mode after start), as in the operation mode MD=4, the correction is performed to be advanced or constant with respect to the target injection timing TRGINJTn as the cooling water temperature TW decreases.

Here, the corrected injection timing TRGINJTHn is continuously set in the operation mode MD=4 and the operation mode MD=5.

Even when the ratio of the fuel injection amount during the compression stroke to the total fuel injection amount during one combustion cycle is increased with the decrease in the engine temperature during the lean combustion or the EGR combustion by performing such correction, the above-described rich-side air-fuel mixture can be formed while maintaining a distance between the adjacent injector 7 and the piston 13 in the latter half of the compression stroke. Therefore, it is possible to suppress the rebound to the exhaust gas since the fuel injected from the injector 7 is attached to the wall surface.

<<Calculation of Corrected Ignition Energy>>

FIG. 8(C) illustrates the characteristic of the corrected ignition energy TRGIGNEH with respect to the cooling water temperature TW, illustrates a case where the upper side from the cooling water temperature TW of the horizontal axis changes the ratio of the injection pulse width during the compression stroke, and illustrates a case where the lower side changes the number of division injections during the compression stroke.

In calculating the corrected ignition energy TRGIGNEH, no correction is performed on the target ignition energy TRGIGNE in any of the operation modes MD=1, 2, 3. In the operation mode MD=4 (EGR operation mode after start), an increasing correction is performed on the target ignition energy TRGIGNE as the cooling water temperature TW decreases. In addition, even in the operation mode MD=5 (lean operation mode after start), the increasing correction is performed on the target ignition energy TRGIGNE as the cooling water temperature TW decreases, similarly to the case of the operation mode MD=4 but such that the increase tendency (specifically, the increase rate of the ignition energy with respect to the decrease of the cooling water temperature TW) is larger than when the operation mode MD=4.

Here, although the corrected ignition energy TRGIGNEH is continuously set in the operation mode MD=4 and the operation mode MD=5, the corrected ignition energy TRGIGNEH may be discontinuously set according to the characteristics of the engine 100 or the like (see FIG. 10 to be described below).

In addition, here, in the case of changing the number of injections during the compression stroke, the corrected ignition energy TRGIGNEH accompanied by the decrease in the cooling water temperature TW is decreased, as compared with the case of changing the ratio of the injection pulse width during the compression stroke. Conversely, in the case of changing the ratio of the injection pulse width during the compression stroke, the corrected ignition energy TRGIGNEH is increased as the cooling water temperature TW decreases, as compared with the case of changing the number of injections during the compression stroke. However, this is made to follow the corrected injection timing TRGINJTHn described with reference to FIG. 8(B). That is, as compared with the amount of the fuel existing around the spark plug 19 at the ignition timing in a case where the corrected injection timing TRGINJTHn is constant (here, in the case of changing the number of injections during the compression stroke), the amount of the fuel existing around the spark plug 19 at the ignition timing in a case where the corrected injection timing TRGINJTHn advances (in the case of changing the ratio of the injection pulse width during the compression stroke) is small. This is because the energy required for ignition increases due to the decrease in the fuel amount.

Even when the ratio of the fuel injection amount during the compression stroke to the total fuel injection amount during one combustion cycle is increased with the decrease in the engine temperature during the lean combustion or the EGR combustion by performing such correction, it is possible to reliably supply the ignition energy necessary for starting the combustion reaction required by the rich-side air-fuel mixture existing around the spark plug 19. In addition, as described above, as compared with the operation mode MD=5 (when the lean combustion is performed), in the operation mode MD=4 (when the EGR combustion is performed), it is possible to avoid both the decrease in the combustion speed due to the excessive concentration of the rich-side air-fuel mixture generated in the EGR combustion and the decrease in the combustion speed due to the dilution of the rich-side air-fuel mixture generated by the lean combustion by decreasing the increase rate of the ignition energy with respect to the decrease in the cooling water temperature TW, and it is possible to avoid the lack of the supply energy for high required ignition energy during the EGR combustion and the excessive supply of the supply energy for required ignition energy lower than during the EGR combustion at the time of the lean combustion.

As a result of calculating the corrected ignition energy TRGIGNEH by correcting the target ignition energy TRGIGNE, for example, in the case of increasing the ignition energy supplied from the spark plug 19 (ignition coil 20), as described with reference to FIG. 7(B), the duration (charge time) of the charge pulse of the ignition signal is increased with respect to the ignition coil 20 (on the bottom dead center side). Nevertheless, if the ignition energy is insufficient, the number of multi-stage discharge pulses (number of discharges) is increased on the top dead center side. Furthermore, if the ignition energy is still insufficient, the ignition energy (increase degree thereof) supplied from the spark plug 19 (ignition coil 20) can be properly controlled by increasing the duration (superimposition time) of the superimposed pulse on the top dead center side, that is, by increasing the charge time, the number of discharges, and the superimposition time stepwise.

By performing the arithmetic processing, the ECU 1 decreases the combustion speed of the air-fuel mixture by decreasing the temperature of the air-fuel mixture temperature in the combustion chamber 17 accompanied by the decrease in the temperature of the engine temperature. Thus, it is possible to suppress the deterioration of the combustion stability of the lean combustion or the EGR combustion, which occurs as a result of the destabilization of the combustion reaction upon ignition or flame propagation, and it is possible to maximize the high efficiency performance and the low exhaust performance of the lean combustion or the EGR combustion.

Figure 9:
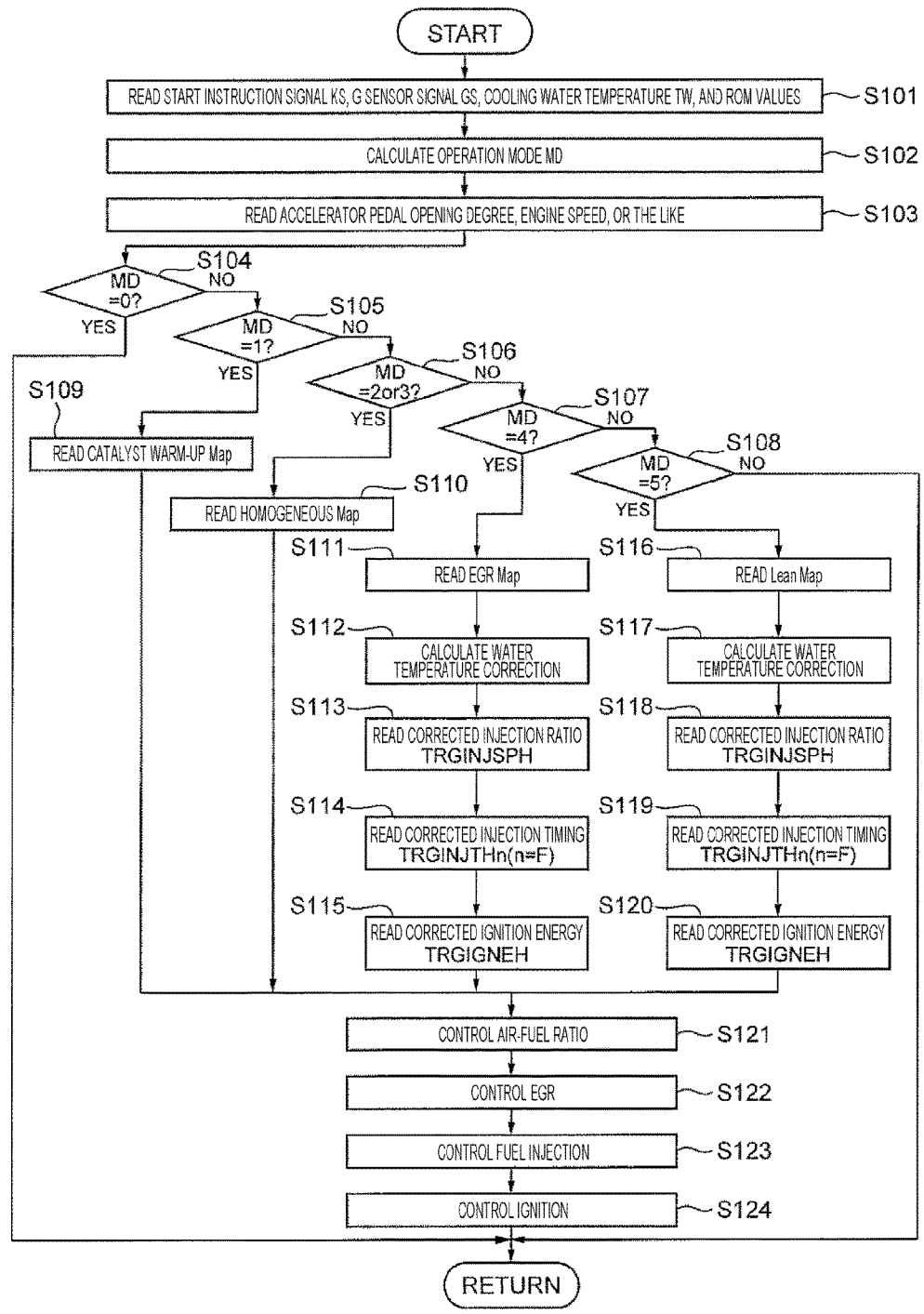
FIG. 9 is a flowchart for describing control contents in the ECU illustrated in FIG. 1.

FIG. 9 is a flowchart for describing control contents in the ECU 1 illustrated in FIG. 1. The control contents illustrated in FIG. 3 are repeatedly executed by the ECU 1 at a predetermined cycle.

As illustrated in FIG. 9, in the ECU 1, in step S101, a start instruction signal KS, a G sensor signal GS, a cooling water temperature TW, values written in the ROM 50d of the ECU 1, and the like are read. Subsequently, in step S102, an operation mode MD is calculated by using, for example, the operation mode determination table shown in FIG. 4. Subsequently, in step S103, an accelerator pedal opening degree, an engine speed, and the like are read.

Subsequently, in step S104, it is determined whether the operation mode MD is 0 with reference to the calculation result in step S102. If YES, the process proceeds to RETURN and repeats this flow. If NO, the process proceeds to step S105 and determines whether the operation mode MD is 1. If YES, the process proceeds to step S109. In step S109, a catalyst warm-up map (control map for catalyst warm-up) is read, and the process proceeds to step S121 by referring to control values (map values) corresponding to the target torque TRGTRQ, the engine speed NE, and the like based on the accelerator pedal opening degree read in step S103. In step S121, the air-fuel ratio control is performed based on the control value referred to in step S109, and the process proceeds to step S122. In step S122, the EGR control is performed based on the control value referred to in step S109, and the process proceeds to step S123. In step S123, the fuel injection control is performed based on the control value referred to in step S109, and the process proceeds to step S124. In step S124, the ignition control is performed based on the control value referred to in step S109.

Each process of the air-fuel ratio control in step S121, the EGR control in step S122, the fuel injection control in step S123, and the ignition control in step S124 will be described below in detail with reference to FIG. 10.

Subsequently, if NO in step S105, the process proceeds to step S106 and determines whether the operation mode MD is 2 or 3. If YES, the process proceeds to step S110. In step S110, a homogeneous map (control map for a homogeneous operation) is read, and each process of steps S121, S122, S123, and S124 is performed by referring to the control values (map values) corresponding to the target torque TRGTRQ, the engine speed NE, and the like based on the accelerator pedal opening degree read in step 103.

Subsequently, if NO in step S106, the process proceeds to step S107 and determines whether the operation mode MD is 4. If YES, the process proceeds to step S111. In step S111, an EGR map (control map for an EGR operation) illustrated in, for example, FIG. 6(A) is read, and the process proceeds to step S112 by referring to control values (map values) corresponding to the target torque TRGTRQ, the engine speed NE, and the like based on the accelerator pedal opening degree read in step 103. In step S112, the water temperature correction calculation described with reference to FIG. 8 is performed, and the process proceeds to step S113. In step S113, the corrected injection ratio TRGINJSPH calculated in step S112 is read, and the process proceeds to step S114. In step S114, the corrected injection timing TRGINJTHn (n=F) calculated in step S112 is read, and the process proceeds to step S115. In step S115, the corrected ignition energy TRGIGNEH calculated in step S112 is read, and the process proceeds to step S121. Similarly, each process of the air-fuel ratio control in step S121, the EGR control in step S122, the fuel injection control in step S123, and the ignition control in step S124 is performed.

Subsequently, if NO in step S107, the process proceeds to step S108 and determines whether the operation mode MD is 5. If YES, the process proceeds to step S116. In step S116, a lean map (control map for a lean operation) illustrated in, for example, FIG. 6(B) is read, and the process proceeds to step S117 by referring to control values (map values) corresponding to the target torque TRGTRQ, the engine speed NE, and the like based on the accelerator pedal opening degree read in step 103. In step S117, the water temperature correction calculation described with reference to FIG. 8 is performed, and the process proceeds to step S118. In step S118, the corrected injection ratio TRGINJSPH calculated in step S117 is read, and the process proceeds to step S119. In step S119, the corrected injection timing TRGINJTHn (n=F) calculated in step S117 is read, and the process proceeds to step S120. In step S120, the corrected ignition energy TRGIGNEH calculated in step S117 is read, and the process proceeds to step S121. Similarly, each process of the air-fuel ratio control in step S121, the EGR control in step S122, the fuel injection control in step S123, and the ignition control in step S124 is performed.

If NO in step S108, the process proceeds to RETURN and repeats this flow.

Figure 10:
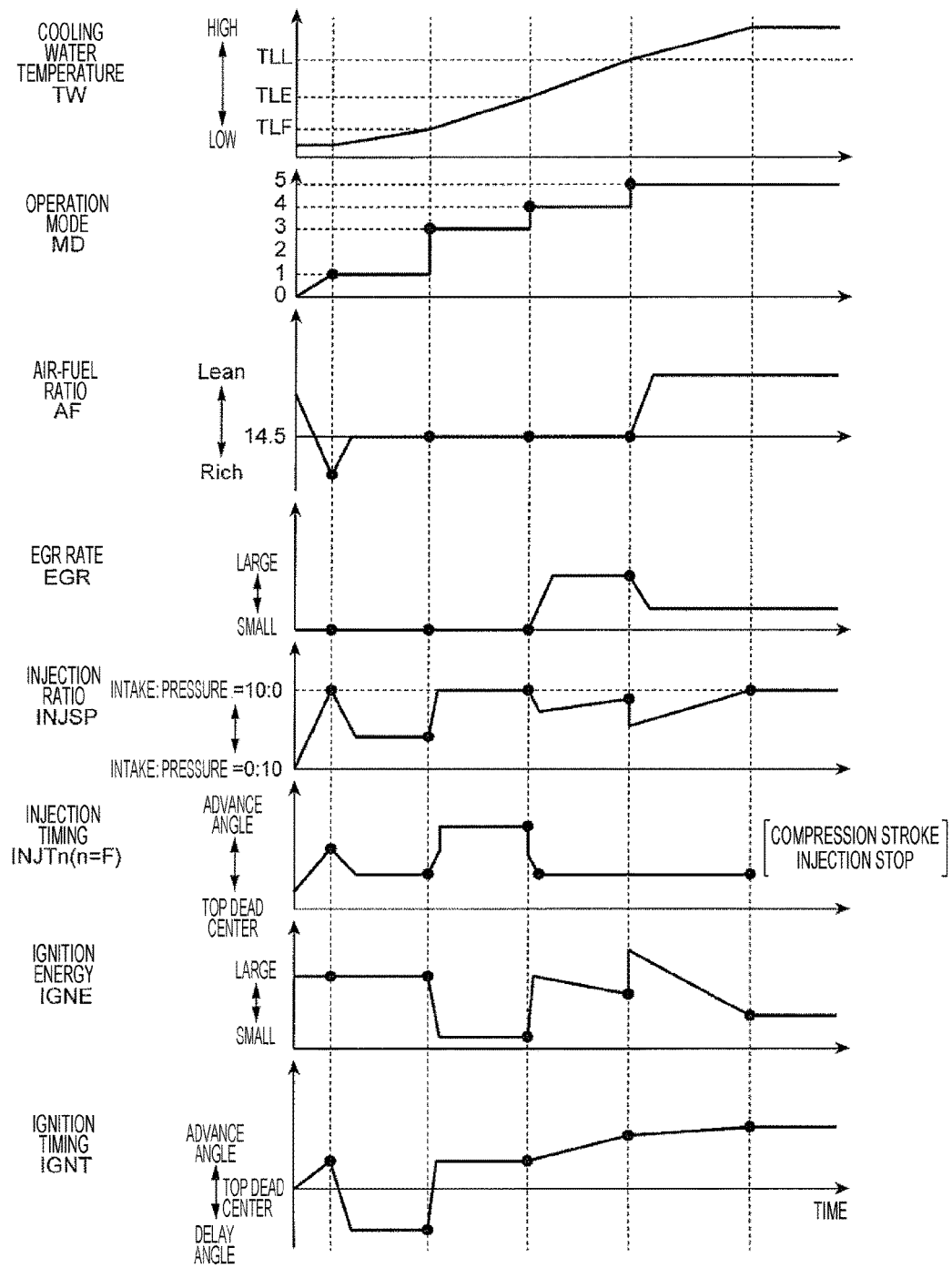
FIG. 10 is a time chart for describing an example of control by the ECU when an operation mode changes from 0 to 5.

FIG. 10 is a time chart for describing an example of control by the ECU 1 when an operation mode changes from 0 to 5.

The cooling water temperature TW begins to rise from a start time when the operation mode MD is 1. When the cooling water temperature TW reaches the cooling water temperature limit TLF, the operation mode MD is 3. When the cooling water temperature TW reaches the cooling water temperature limit TLE (>TLF), the operation mode MD is 4. When the cooling water temperature TW reaches the cooling water temperature limit TLL (>TLE), the operation mode MD is 5.

When the operation mode MD is 1 to 4, the air-fuel ratio is controlled to the stoichiometric air-fuel ratio, and when the operation mode MD is 5, the air-fuel ratio is controlled to be lean, which is a state in which the air is more excessive than the stoichiometric air-fuel ratio.

When the operation mode MD is 1 to 3, the EGR is not permitted, and thus the EGR rate is 0. When the operation mode MD is 4 and 5, the EGR rate is increased.

When the operation mode MD is 1, the injection ratio INJSP increases the injection ratio during the compression stroke, so as to stabilize the combustion by arranging the rich air-fuel mixture around the spark plug 19 as a catalyst warm-up mode. When the operation mode MD is 2 and 3, the injection ratio decreases the injection ratio during the compression stroke as a homogeneous operation mode. When the operation mode MD is 4 and 5, the injection ratio during the compression stroke is increased as the EGR operation mode and the lean operation mode. Here, in a case where the cooling water temperature TW decreases when the operation mode MD is 4 or 5, the correction is performed to increase the injection ratio during the compression stroke (see also FIG. 8(A)). When the operation mode MD is 5 and the cooling water temperature TW becomes high to some extent, the injection ratio during the compression stroke is set to 0 (the injection during the compression stroke is stopped) so that the injection is performed only in the intake stroke.

In addition, here, when the operation mode MD is 4 or 5, the injection timing INJTHn (n=F) is corrected so as to be constant even when the cooling water temperature TW decreases, but the correction can be performed to be advanced (see also FIG. 8(B)).

In addition, when the operation mode MD is 4 or 5, the ignition energy IGNE is corrected so as to increase when the cooling water temperature TW decreases (see also FIG. 8(C)).

Since the injection timing INJTHn, the ignition energy IGNE, and the ignition timing IGNT when the operation mode MD is 1 to 3 are controlled by a conventionally known method, a detailed description thereof will be omitted.

As described above, in the EGR operation mode or the lean operation mode in which the EGR combustion or the lean combustion is performed according to the cooling water temperature TW, the combustion stability of the EGR combustion or the lean combustion can be improved by controlling the injection ratio INJSP, the injection timing INJTn, and the ignition energy IGNE according to the aforementioned corrected injection ratio TRGINJSPH, corrected injection timing TRGINJTHn, and corrected ignition energy TRGIGNEH. As a result, the combustion speed of the air-fuel mixture is lowered by the decrease in the temperature of the air-fuel mixture in the combustion chamber 17 accompanied by the decrease in the engine temperature. Thus, it is possible to suppress the deterioration of the combustion stability of the EGR combustion or the lean combustion, which occurs as a result of the destabilization of the combustion reaction upon ignition or flame propagation, and it is possible to maximize the high efficiency performance and the low exhaust performance of the EGR combustion or the lean combustion.

As such, according to the present embodiment, when the lean combustion that burns the air-fuel mixture leaner than the stoichiometric air-fuel ratio and the EGR combustion that burns the air-fuel mixture diluted by re-suctioning the exhaust gas discharged from the combustion chamber 17 into the combustion chamber 17 are performed, the ratio of the fuel injection amount during the compression stroke to the total fuel injection amount during one combustion cycle increases as the temperature of the engine 100 decreases. Thus, the decrease the combustion speed accompanied by the decrease in the engine temperature, that is, the decrease in the temperature of the air-fuel mixture in the combustion chamber 17 can be suppressed by the high combustion speed of the rich-side air-fuel mixture accompanied by the increase in the ratio of the fuel injection amount during the compression stroke. More specifically, at the ignition timing by the spark plug 19, the air-fuel mixture in the combustion chamber 17 (in the cylinder of the engine 100) approaches the stoichiometric air-fuel ratio from the lean air-fuel ratio as it approaches the spark plug 19 by controlling the ratio of the fuel injection amount during the compression stroke to the total fuel injection amount during one combustion cycle according to the change in the temperature of the engine 100. In other words, at the ignition timing by the spark plug 19, the air-fuel mixture around the spark plug 19 in the combustion chamber 17 approaches the stoichiometric air-fuel ratio from the lean air-fuel ratio. Therefore, the stoichiometric air-fuel ratio around the spark plug 19 and the lean air-fuel mixture leaning away from the spark plug 19 can be arranged in the combustion chamber 17. Even when the temperature of the engine 100 is lowered during the lean combustion or the EGR combustion, the combustion reaction spreading from the spark plug 19 into the combustion chamber 17 can be smoothly propagated, and the combustion speed of the air-fuel mixture in the combustion chamber 17 can be increased.

In addition, the ratio of the fuel injection amount during the compression stroke is increased by increasing the ratio of the injection pulse width during the compression stroke to the total injection pulse width during the intake stroke and the compression stroke set in advance based on the operating state of the engine 100 or by increasing the number of division injections during the compression stroke while maintaining the total fuel injection amount during one combustion cycle set in advance based on the operating state of the engine 100. Therefore, it is possible to accurately control the generation of the air-fuel mixture having the high combustion speed by driving the injector 7.

In addition, even when the ratio of the fuel injection amount during the compression stroke to the total fuel injection amount during one combustion cycle is increased with the decrease in the engine temperature during the lean combustion or the EGR combustion by making the injection completion timing of the last stage (the falling timing of the injection pulse) in the compression stroke constant or advanced, the above-described rich-side air-fuel mixture can be formed while maintaining a distance between the adjacent injector 7 and the piston 13 in the latter half of the compression stroke. Therefore, it is possible to suppress the rebound to the exhaust gas since the fuel injected from the injector 7 is attached to the wall surface.

In addition, the ignition energy of the ignition device is increased by increasing the ignition energy of the ignition device set in advance based on the operating state of the engine 100 as the temperature of the engine 100 decreases, specifically, by increasing at least one of the charge time, the number of discharges, and the superimposition time of the ignition device set in advance based on the operating state of the engine 100 as the temperature of the engine 100 decreases. During the lean combustion or the EGR combustion, even when the ratio of the fuel injection amount during the compression stroke to the total fuel injection amount during one combustion cycle increases with the decrease in the engine temperature, it is possible to reliably supply the ignition energy necessary for starting the combustion reaction required by the rich-side air-fuel mixture existing around the spark plug 19.

In addition, since the ignition energy of the ignition device is increased by performing the increase in the charge time of the ignition device, the increase in the number of discharges of the ignition device, and the increase in the superimposition time of the ignition device stepwise, the ignition energy (the increase degree thereof) supplied from the ignition device can be appropriately controlled.

In addition, as compared with a case where the lean combustion is performed, when the EGR combustion is performed, the increase rate of the ratio of the fuel injection amount during the compression stroke with respect to the decrease in the temperature of the engine 100 is decreased. Alternatively, as compared with a case where the lean combustion is performed, when the EGR combustion is performed, by decreasing the increase rate of the ignition energy with respect to the decrease in the temperature of the engine 100, it is possible to avoid both the decrease in the combustion speed due to the excessive concentration of the rich-side air-fuel mixture generated in the EGR combustion and the decrease in the combustion speed due to the dilution of the rich-side air-fuel mixture generated in the lean combustion, and it is possible to avoid the lack of the supply energy for high required ignition energy during the EGR combustion and the excessive supply of the supply energy for required ignition energy lower than during the EGR combustion at the time of the lean combustion.

Therefore, according to the present embodiment, the combustion speed of the air-fuel mixture is lowered by the decrease in the temperature of the air-fuel mixture in the combustion chamber 17 accompanied by the decrease in the engine temperature. Thus, it is possible to suppress the deterioration of the combustion stability of the lean combustion or the EGR combustion, which occurs as a result of the destabilization of the combustion reaction upon ignition or flame propagation, and it is possible to maximize the high efficiency performance and the low exhaust performance of the lean combustion or the EGR combustion.

The present invention is not limited to the above-described embodiments and various modifications can be made thereto. For example, the embodiments have been described in detail for easy understanding of the present invention and are not intended to limit to those necessarily including all the above-described configurations.

All or part of the above-described configurations, functions, processing units, processing means, and the like may be realized by hardware, for example, design of integrated circuits or the like. In addition, each of the above-described configurations, functions, and the like may be realized by software which causes a processor to interpret and execute a program that realizes each function. Information of the programs, the tables, the files, and the like that realize each function can be stored in a storage device such as a memory, a hard disk, a solid state drive (SSD), or a recording medium such as an IC card, an SD card, or a DVD.

In addition, control lines or information lines indicate what is considered to be necessary for the description, and all the control lines or information lines are not necessarily illustrated on products. In practice, it can be considered that almost all the configurations are mutually connected.

REFERENCE SIGNS LIST

1 ECU (engine control device)
1a operation mode calculation unit
1b control value calculation unit
1c water temperature correction calculation unit
2 accelerator pedal opening degree sensor
3 airflow sensor
4 intake air temperature and humidity sensor
5 throttle
6 tumble valve
7 injector (fuel injection device)
8 fuel pump
9 common rail
10 fuel pipe
11 intake pipe
12 variable valve
13 piston
14 crankshaft
15 crank angle sensor
16 knock sensor
17 combustion chamber
18 cooling water temperature sensor
19 spark plug (part of ignition device)
20 ignition coil (part of ignition device)
21 pressure sensor (ion current sensor)
22 exhaust pipe
23 three-way catalyst
24 exhaust gas temperature sensor
25 air-fuel ratio sensor
26 EGR valve
27 EGR cooler
28 exhaust gas reflux pipe
29 cooling water pump
30 cooling water flow path switching valve
31 control shaft
32 G sensor
33 fuel pressure sensor
100 engine

The invention claimed is:

1. An engine control device comprising: a fuel injection device which performs fuel injection a plurality of times during one combustion cycle with respect to a combustion chamber of an engine; an ignition device which ignites fuel supplied from the fuel injection device to the combustion chamber; and a temperature detection unit which detects a temperature of the engine, a fuel injection amount injected from the fuel injection device being controlled based on the temperature of the engine detected by the temperature detection unit, wherein when lean combustion in which an air-fuel mixture leaner than a stoichiometric air-fuel ratio is burned or an exhaust gas recirculation combustion in which a diluted air-fuel mixture is burned by re-suctioning exhaust gas discharged from the combustion chamber into the combustion chamber is performed, a ratio of a fuel injection amount during a compression stroke to a total fuel injection amount during one combustion cycle is increased as the temperature of the engine decreases.

2. The engine control device according to claim 1, wherein the control device increases the ratio of the fuel injection amount during the compression stroke by increasing a ratio of an injection pulse width during the compression stroke to a total injection pulse width during an intake stroke and a compression stroke set in advance based on an operating state of the engine or by increasing the number of division injections during the compression stroke while maintaining a total fuel injection amount during one combustion cycle set in advance based on the operating state of the engine.

3. The engine control device according to claim 2, wherein the control device makes an injection completion timing of a last stage during the compression stroke constant or advanced.

4. The engine control device according to claim 1, wherein, in a case where the exhaust gas recirculation combustion is performed, the control device decreases an increase rate of the ratio of the fuel injection amount during the compression stroke to the decrease in the temperature of the engine, as compared with the case where the lean combustion is performed.

5. The engine control device according to claim 1, wherein, as the temperature of the engine decreases, the control device increases the ignition energy of the ignition device set in advance based on the operating state of the engine.

6. The engine control device according to claim 5, wherein, as the temperature of the engine decreases, the control device increases the ignition energy of the ignition device by increasing at least one of a charge time, the number of discharges, and a superimposition time of the ignition device set in advance based on the operating state of the engine.

7. The engine control device according to claim 5, wherein the control device increases the ignition energy of the ignition device by performing an increase in a charge time of the ignition device, an increase in the number of discharges of the ignition device, and an increase in a superimposition time of the ignition device stepwise.

8. The engine control device according to claim 5, wherein, in a case where the exhaust gas recirculation combustion is performed, the control device decreases an increase rate of the ignition energy with respect to the decrease in the temperature of the engine, as compared with the case where the lean combustion is performed.

9. The engine control device according to claim 1, wherein the control device controls the ratio of the fuel injection amount during the compression stroke to the total fuel injection amount during one combustion cycle according to the change in the temperature of the engine, such that, at an ignition timing by the ignition device, an air-fuel mixture in the combustion chamber approaches a stoichiometric air-fuel ratio from a lean air-fuel ratio as approaching the ignition device.

10. The engine control device according to claim 1, wherein the control device increases the ratio of the fuel injection amount during the compression stroke to the total fuel injection amount during one combustion cycle according to the decrease in the temperature of the engine, such that, at an ignition timing of the ignition device, an air-fuel mixture around the ignition device in the combustion chamber approaches a stoichiometric air-fuel ratio from a lean air-fuel ratio.

\* \* \* \* \*